United States Patent [19]

Olstowski et al.

[11] Patent Number: 4,485,031

[45] Date of Patent: Nov. 27, 1984

[54] COMPATIBLE MIXTURES OF AMINATED POLYETHER POLYOLS AND LOW MOLECULAR WEIGHT GLYCOLS

[75] Inventors: Franciszek Olstowski, Freeport; Richard D. Peffley, Lake Jackson, both of Tex.

[73] Assignee: The Dow Chemical Company, Midland, Mich.

[21] Appl. No.: 531,108

[22] Filed: Sep. 12, 1983

[51] Int. Cl.$^3$ .................... C09K 3/00; H05B 33/00
[52] U.S. Cl. .................................. 252/182; 568/624; 560/158
[58] Field of Search .................. 252/182; 568/624; 560/158

[56] References Cited

U.S. PATENT DOCUMENTS

| | | | |
|---|---|---|---|
| 3,929,730 | 12/1975 | Graefe et al. | 528/83 |
| 3,993,576 | 11/1976 | Barron | 252/182 |
| 4,008,185 | 2/1977 | Olstowski | 521/163 |
| 4,273,884 | 6/1981 | Dominguez | 521/114 |
| 4,312,775 | 1/1982 | Ranek et al. | 568/624 |

*Primary Examiner*—John Kight
*Assistant Examiner*—Nathan M. Nutter
*Attorney, Agent, or Firm*—J. G. Carter

[57] ABSTRACT

Incompatible compositions containing a relatively high molecular weight polyol containing terminal primary amine groups and a relatively low molecular weight polyol containing primary hydroxyl groups are rendered compatible by the addition thereto of a substituted urea such as dimethyl urea.

6 Claims, No Drawings

COMPATIBLE MIXTURES OF AMINATED POLYETHER POLYOLS AND LOW MOLECULAR WEIGHT GLYCOLS

BACKGROUND OF THE INVENTION

The present invention concerns compatible mixtures of relatively high molecular weight aminated polyether polyols and ethylene glycol containing a substituted urea.

Polyurethane articles, commonly formed by the Reaction Injection Molding (RIM) process, are polymer products resulting from the reaction of liquid polyol mixtures of high molecular weight polyether polyols (m.w. >2000) and chain extenders such as ethylene glycol (EG) or 1,4 butane diol with liquid polyisocyanates. Other RIM processes utilize a blend of aliphatic and/or aromatic amine chain extenders (in the presence or absence of glycol chain extenders) and high molecular weight polyether polyols reacted with liquid polyisocyanates. Still other RIM processes are based on the blend of glycols such as ethylene glycol and amine terminated high molecular weight liquid polyethers to react with liquid polyisocyanates. This last named RIM process based on the use of amine terminated high molecular weight polyethers and ethylene glycol blends exhibit the following advantageous characteristics compared to systems utilizing ethylene oxide capped high molecular weight polyether polyols:

(A) Shows overall better processability with less skin delamination problems with the demolded RIM part and the RIM part exhibits a higher green strength at demold.

(B) RIM parts exhibiting fewer defects can be demolded at lower tool (mold) temperature. With less critical tool temperatures being required, the RIM part manufacturing results in advantageously wider processing "latitudes".

(C) Use of amine terminated high molecular weight polyethers and ethylene glycol blend as the reactive components yield RIM polymers that exhibit the following improvements in physical properties: a higher flexural modulus at the same ethylene glycol level compared to the use of high molecular weight polyether polyols; higher elongation values at tensile break at the same ethylene glycol level; and higher tear strengths (Die "C") at the same ethylene glycol levels.

The aforementioned improvements become more pertinent at the lower flexural modulus levels (lower ethylene glycol levels) of the RIM polymers or those polymers exhibiting low hardness values (<95 shore A).

Although amine terminated high molecular weight polyethers plus ethylene glycol exhibit the above advantages, formulations based on this blend are incompatible fluids that tend to separate into layers on standing.

Recognition of this effect dictates that these blends should be constantly agitated to avoid a misformulation by the separation of components. If the blend of amine terminated polyether and glycol also contain a organometal catalyst, (such as an organotin compound) a catalyst separation may also occur.

We have discovered that the addition of a minor amount of a substituted urea to the incompatible blend of ethylene glycol and amine terminated high molecular weight liquid polyethers renders these mixtures into a compatible or single phase liquid. We have further discovered that the presence of these substituted ureas not only can compatibilize the above mentioned blends but also can serve as the sole catalyst for the reaction of amine/polyol blends with polyisocyanates. This is particularly advantageous since the commonly used organotin catalysts have been found to lose catalytic activity in the presence of amines over a period of time and the rate of catalyst (organotin) decay increases with an increase in storage temperature.

SUMMARY OF THE INVENTION

One aspect of the present invention pertains to a compatible blend comprising (A) at least one relatively high molecular weight polyol containing at least one terminal primary amine group and having an average molecular weight of at least about 2000;

(B) ethylene glycol; and (C) at least one material which is either a liquid or has a melting point less than about 200° C. represented by the formula

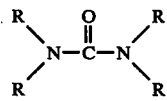

wherein each R is independently hydrogen or a hydrocarbyl group having a sufficient number of carbon atoms such that the molecular weight of such group is not greater than about 400, preferably less than about 200 but with the proviso that at least one R group is not hydrogen; wherein (1) components (A) and (B) are present in quantities such that the composition without the presence of component (C) is an incompatible mixture; and (2) component (C) is present in a quantity sufficient to render the composition compatible.

The term incompatible as employed herein means that the composition upon storage at a temperature of at least 25° C. forms at least two distinct layers within less than 5 days. The term compatible means that the mixture remains a single phase at a temperature of about 25° C. for at least 5 days.

DETAILED DESCRIPTION OF THE INVENTION

Suitable relatively high molecular weight polyether polyols having at least one terminal primary amine group which can be employed herein include those polyether polyols having from about 2 to about 8 hydroxyl groups per molecule which have subsequently been aminated.

These and other suitable polyether polyols containing terminal amine groups are described in Canadian Pat. No. 784,293 issued Apr. 30, 1968 to Schroter et al.; U.S. Pat. No. 3,155,657 issued Nov. 3, 1964 to Bedoit, Jr.; U.S. Pat. No. 3,155,728 issued Nov. 3, 1964 to Lesesne; U.S. Pat. No. 3,161,682 issued Dec. 15, 1964 to Lesesne et al.; U.S. Pat. No. 3,231,619 issued Jan. 25, 1966 to Speranza; U.S. Pat. No. 3,236,895 issued Feb. 22, 1966 to Lee et al.; U.S. Pat. No. 3,436,359 issued Apr. 1, 1969 to Hubin et al.; U.S. Pat. No. 3,654,370 issued Apr. 4, 1972 to Yeakey; U.S. Pat. No. 3,838,076 issued Sept. 24, 1974 to Moss et al.; and U.S. Pat. No. 3,847,992 issued Nov. 12, 1974 to Moss which are incorporated herein by reference.

Particularly suitable substituted ureas which can be employed herein include, for example, dimethyl urea, dialkyl urea, tetramethyl urea, mixtures thereof and the like.

The method for preparing the stable mixture is not critical, but the preferred method is to dissolve the substituted urea in the ethylene glycol and add the resultant mixture to the high molecular weight primary amine-containing polyether polyol.

The following examples are illustrative of the present invention but are not to be construed as to limiting the scope thereof in any manner.

A series of mixtures were prepared and the stability thereof was observed after standing for 5 days at 25° C. The composition and results are given in the following table.

Next, approximately 0.1 wt. % of an organotin catalyst (based on contents of "B" tank) was added to the contents of the "B" tank and blended. With the pumps set to deliver the same fluid ratios as before (B/A=1.20) and the sheet mold set at the same temperature as before, RIM sheets were removed from the mold in the same intervals as before and subjected to the same post cure process. These RIM formed sheets, having been polymerized in the presence of an organotin catalyst were subjected to the same property tests as before with the results shown below:

| Tensile Strength | 1933 psi | (13,328 kPa) |
|---|---|---|
| Percent Elongation | 260 | |
| Flexural Modulus | 15,674 psi | (108,069 kPa) |
| Tear Resistance | 384 pli | (6857 kg/m) |

| EXAMPLE NO. OR OR COMPARATIVE EXPERIMENT NO. | AMINATED POLYOL[1] pbw[2] | ETHYLENE GLYCOL pbw | UREA | DIMETHYL UREA pbw | DIALLYL UREA pbw | REMARKS |
|---|---|---|---|---|---|---|
| Comp. Expt. A | 100 | 20 | 0 | 0 | 0 | Incompatible |
| Comp. Expt. B | 100 | 20.25 | 6.75 | 0 | 0 | Incompatible |
| Comp. Expt. C | 100 | 24 | 16 | 0 | 0 | Incompatible |
| Comp. Expt. D | 100 | 25 | 25 | 0 | 0 | Dispersion of solids in liquid |
| Comp. Expt. E | 100 | 20.8 | 0 | 5.2 | 0 | Incompatible |
| Example 1 | 100 | 18 | 0 | 6 | 0 | Compatible |
| Example 2 | 100 | 16.25 | 0 | 8.75 | 0 | Compatible |
| Example 3 | 100 | 25 | 0 | 25 | 0 | Compatible |
| Example 4 | 100 | 18 | 0 | 0 | 12 | Compatible |

[1]Aminated polyoxypropylene glycol having an average molecular weight of about 2000 commercially available from Texaco Chemical Co. as Jeffamine ® D-2000
[2]pbw = parts by weight

EXAMPLE 5

A compatible blend containing approximately 9.9 wt. % of dimethyl urea and consisting of 13.2 pbw dimethyl urea, 20 pbw ethylene glycol and 100 pbw Jeffamine ® D2000 was added to the "B" side holding tank of an Admiral 400 - 2HP (impingement mixing) RIM processing machine feeding a sheet forming mold. The "A" side tank contained a liquid MDI (Upjohn Isonate 143L) isocyanate having an isocyanate equivalent weight of 144. The feed pumps on this RIM processing machine were set at a "B"/"A" ratio of 1.20 pbw of "B" tank blend per pbw of "A" tank isocyanate delivered.

The sheet forming mold, designed to form polymer sheets having the dimensions of 12.25 inches (31.1 cm) by 14.75 inches (37.465 cm) by 0.125 inches (0.3175 cm) thick, was preheated to about 170° F. (77° C.) and was filled with the impingement mixed reactive blend described above. Sixty seconds after the fluid injection, polymer sheets were removed from the mold and then subjected to a post cure process of a 30 minute (1800 s) residence in an oven heated to 265° F. (129.4° C.).

The properties determined on these sheets are reported in the table below:

| Property | Method | Value |
|---|---|---|
| Tensile Strength, psi | ASTM 412-68 | 2,150 |
| kPa | | 14,824 |
| Elongation, % | ASTM 412-68 | 223 |
| Flexural Modulus, psi | ASTM D-790 | 11,930 |
| kPa | | 82,255 |
| Tear Resistance, pli | ASTM D-624-70 | 413 |
| kg/m | | 7,375 |
| Shore D Hardness | Shore Durometer | 50 |
| Specific Gravity, gm/cc | | 1.00 |
| Density | | 0.95 gm/cc |

Then, the feed pumps on this machine were set to deliver 1.06 pbw of "B" side fluid per pbw of "A" side fluid. The test results shown below illustrate the change in polymer properties as a function of the B/A pump ratio setting. The RIM sheet forming and post cure procedures are identical to the previous tests. The "B" side fluid contained the tin catalyst.

| Property | Value | |
|---|---|---|
| Tensile Strength, psi | 1974 | (13,610 kPa) |
| % Elongation | 172 | |
| Flexural Modulus, psi | 24,567 | (169,385 kPa) |
| Tear Resistance | 400 | |
| Density | 0.96 g/cc | |
| B/A Pump Ratio Setting pbw/pbw | 1.06 | |

A comparison of this dimethyl urea compatibilized RIM polymer produced at a B/A pump ratio of 1.06 shows an increase in flexural modulus and tear resistance with a decrease in % elongation compared to a B/A pump ratio setting of 1.20.

We claim:
1. A compatible blend comprising
   (A) at least one relatively high molecular weight polyol containing at least one terminal primary amine group and having an average molecular weight of at least about 2000;
   (B) ethylene glycol; and
   (C) at least one material which is either a liquid or has a melting point less than about 200° C. represented by the formula

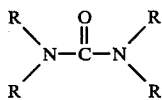

wherein each R is independently hydrogen or a hydrocarbyl group having a sufficient number of carbon atoms such that the molecular weight of such group is not greater than about 400, but with the proviso that at least one R group is not hydrogen; wherein (1) components (A) and (B) are present in quantities such that the composition without the presence of component (C) is an incompatible mixture; and (2) component (C) is present in a quantity sufficient to render the composition compatible.

2. A compatible blend of claim 1 wherein Component (A) is an aminated polyether polyol having before amination an average molecular weight of from about 2000 to about 8000 and an average hydroxyl functionality of from about 2 to about 8.

3. A compatible blend of claim 2 wherein Component (A), before amination, has an average hydroxyl functionality of from about 2 to about 3.

4. A compatible blend of claim 1 wherein Component (C) is dimethyl urea or diallyl urea.

5. A compatible blend of claim 2 wherein Component (C) is dimethyl urea or diallyl urea.

6. A compatible blend of claim 3 wherein Component (C) is dimethyl urea or diallyl urea.

* * * * *